Jan. 24, 1950  K. G. NIELSEN  2,495,418
TRUCK BED CONSTRUCTION
Filed Oct. 13, 1947  2 Sheets-Sheet 1
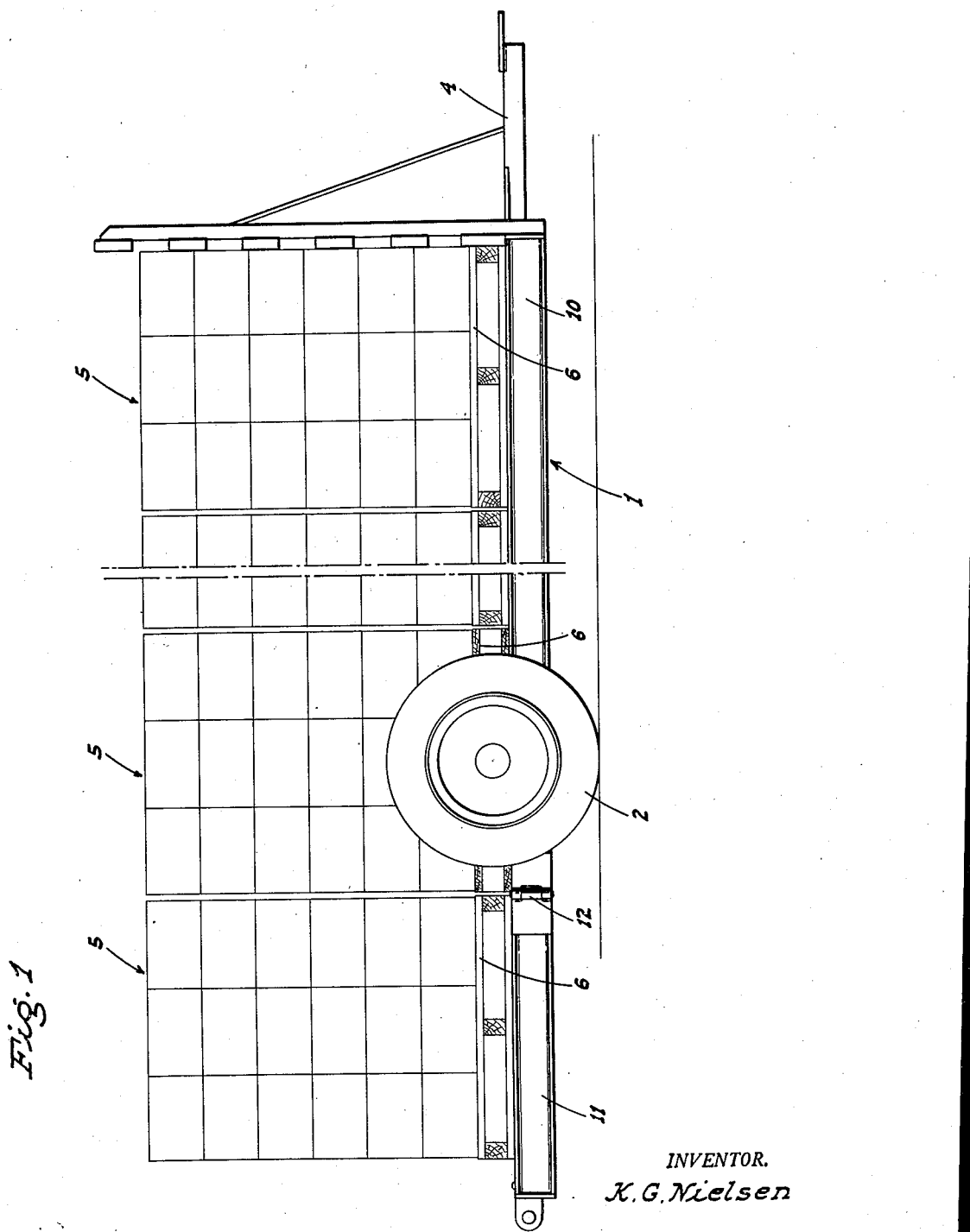
INVENTOR.
K. G. Nielsen
ATTYS Jan. 24, 1950 K. G. NIELSEN 2,495,418
TRUCK BED CONSTRUCTION
Filed Oct. 13, 1947 2 Sheets-Sheet 2
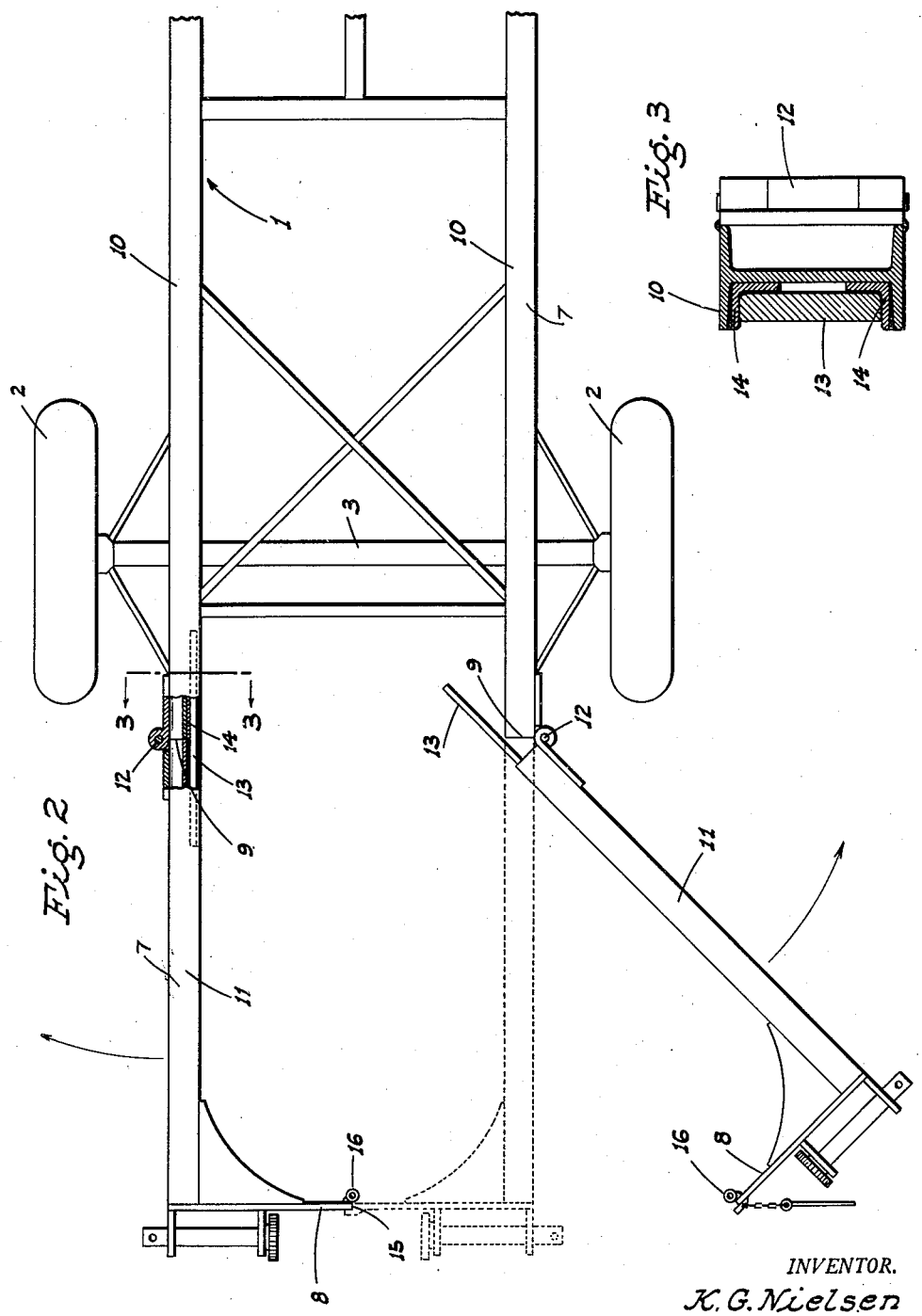

Patented Jan. 24, 1950

2,495,418

UNITED STATES PATENT OFFICE 2,495,418

TRUCK BED CONSTRUCTION

Karl George Nielsen, Hughson, Calif.

Application October 13, 1947, Serial No. 779,471

13 Claims. (Cl. 280—106)

This invention is directed to, and it is an object to provide, a novel bed construction for a truck, especially a truck of low-bed, two-wheel trailer type, adapted for use to haul pallet supported stacks of loaded lug boxes as from the field to a cannery; said bed construction being for the purpose of facilitating loading and unloading thereof by a fork truck.

In box hauling trucks, particularly of the above type, the wheels project above the bed intermediate the ends thereof, which ordinarily makes it difficult, if not impossible, for a fork truck to reach and engage the pallet supported stack disposed on the bed between said wheels.

The present invention provides a bed construction arranged for access of a fork truck to the pallet supported stack disposed on the bed directly between the wheels; this being accomplished by constructing the part of the bed rearwardly of the wheels for lateral swinging motion to an out-of-the-way position from a normal alined position.

A further object of the invention is to provide a practical and convenient device, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the truck bed loaded; the view being foreshortened.

Fig. 2 is a plan view of the truck bed unloaded; one rear section of the side beams being shown as swung laterally to its out-of-the-way position.

Fig. 3 is an enlarged cross section on line 3—3 of Fig. 2.

Referring now more particularly to the characters of reference on the drawings, the invention is here shown as embodied in a low bed trailer-type truck wherein the low bed is indicated generally at 1. The bed 1 is supported, intermediate its ends, and on opposite sides, by a pair of transversely spaced wheels 2 carried on an axle 3 suitably mounted and braced in connection with said bed.

At the forward end the bed 1 includes a tongue 4 adapted for connection to a draft vehicle. This type of low bed truck, in trailer form, is used particularly for the transport of loaded lug boxes from the field to a cannery. The lug boxes are initially disposed in stacks 5 on supporting pallets 6; these pallets being of a type adapted to be engaged by a fork-type lift truck, whereby said stacks may be placed on the bed 1, or unloaded therefrom.

As the wheels 2 project some distance above the top of the bed 1 it is impossible, with a conventional low bed truck, to use a fork truck to load or unload the pallet-supported stack between the wheels 2 on the bed 1. It is the purpose of the present invention to so construct the bed 1 that fork truck loading or unloading of the stack between the wheels can be readily and conveniently accomplished. The bed 1 is therefore constructed as follows:

The bed 1 includes a pair of longitudinal, transversely spaced side beams, indicated generally at 7, secured together by suitable cross members and bracing, which includes a rear cross beam 8. Adjacent but rearwardly of the wheels 2 the side beams 7 are each split, as at 9, into a forward section 10 and a rearward section 11.

The sections 10 and 11 of each side beam 7 are normally longitudinally alined but are hinged together on the outside, as at 12, for laterally outward swinging motion in the manner illustrated in Fig. 2.

The side beams 7 are I-beams, with the web vertical. Adjacent the split 9, each rearward section 11 includes, on the inner side thereof, and affixed to the web, a forwardly projecting stabilizer arm 13. Each stabilizer arm projects forwardly into the corresponding rear end portion of the adjacent forward section 10 and snugly engages therein by reason of angle iron fillers 14 secured to the same. With this arrangement the stabilizer arms 13 prevent any sagging at the rear end of the bed and also relieve the strain on the hinges 12 when the bed is loaded and in transport.

The rearward sections 11 of the side beams are connected by the rear cross beam 8, which cross beam is centrally split, as at 15, but normally engaged at the split by a releasable latch 16.

The releasable latch 16 normally maintains the rearward sections 11 in alinement with the forward sections 10.

To load or unload the pallet-supported box stack 5 between the wheels 2 the releasable latch 16 is disengaged and the rearward sections 11 of the side beams are swung laterally outwardly so that a fork truck may approach sufficiently close, from the rear, to either load or unload said stack. The pallet 6 of said between-wheels stack is disposed so that the fork openings are accessible from the rear rather than from the side as for the remainder of the stacks. After the between-wheels stack 5 has been loaded or unloaded the rearward sections 11 are returned to their normal alined position so that the bed is then usable in the manner of a conventional truck.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and on which Letters Patent are desired.

1. A bed construction for a low-bed truck including wheels on opposite sides of the bed and intermediate its ends, with the wheels projecting above said bed; the bed comprising a forward load supporting section between the wheels, a rearward load supporting section mainly rearwardly of the wheels, said sections being normally alined, and means mounting the rearward section in connection with the forward section for lateral motion to an out-of-the-way position.

2. A bed construction for a low-bed truck including wheels on opposite sides of the bed and intermediate its ends, with the wheels projecting above said bed; the bed comprising a forward load supporting section between the wheels, a rearward load supporting section mainly rearwardly of the wheels, said sections being normally alined, and means hinging the rearward section for horizontal swinging motion between a normally longitudinally alined position and a laterally disposed out-of-the-way position.

3. A bed construction for a low-bed truck including wheels on opposite sides of the bed and intermediate its ends, with the wheels projecting above said bed; the bed comprising a forward load supporting section between the wheels, a load supporting section to the rear of the wheels, said sections being normally alined, means hinging the rearward section for horizontal swinging motion between a normally longitudinal alined position and a laterally disposed out-of-the-way position, and releasable latch means normally preventing such motion of the rearward section.

4. A bed construction for a low bed truck including wheels on opposite sides of the bed and intermediate its ends, with the wheels projecting above said bed; the bed comprising a forward load supporting section between the wheels, a rearward load supporting section mainly rearwardly of the wheels, said sections being normally alined, the rearward section including separate longitudinal parts, and means hinging said separate longitudinal parts for outward lateral swinging motion from a normally longitudinal position to a laterally disposed out-of-the-way position.

5. A bed construction for a low bed truck including wheels on opposite sides of the bed and intermediate its ends, with the wheels projecting above said bed; the bed comprising a forward load supporting section between the wheels, a rearward load supporting section mainly rearwardly of the wheels, said sections being normally alined, the rearward section including separate longitudinal parts, means hinging said separate longitudinal parts for outward lateral swinging motion from a normally longitudinal position to a laterally disposed out-of-the-way position, and a releasable latch normally securing said parts against motion.

6. A bed construction for a low bed truck including wheels on opposite sides of the bed and intermediate its ends, with the wheels projecting above said bed; said bed comprising transversely spaced, longitudinal load supporting side beams, said side beams each including a forward section and a rearward section, the wheels supporting the forward sections adjacent their rear ends, the sections of corresponding side beams being normally substantially longitudinally alined, means mounting the rear sections for laterally outward swinging motion to an out-of-the-way position, and releasable latch means normally preventing such motion.

7. A bed construction for a low bed truck including wheels on opposite sides of the bed and intermediate its ends, with the wheels projecting above said bed; said bed comprising transversely spaced, longitudinal load supporting side beams, said side beams each including a forward section and a rearward section, the wheels supporting the forward sections adjacent their rear ends, the sections of corresponding side beams being normally substantially longitudinally alined, means mounting the rear sections for laterally outward swinging motion to an out-of-the-way position, and releasable latch means normally preventing such motion; said mounting means being hinges between adjacent ends of corresponding sections.

8. A bed construction for a low bed truck including wheels on opposite sides of the bed and intermediate its ends, with the wheels projecting above said bed; said bed comprising transversely spaced, longitudinal load supporting side beams, said side beams each including a forward section and a rearward section, the wheels supporting the forward sections adjacent their rear ends, the sections of corresponding side beams being normally substantially longitudinally alined, means mounting the rear sections for laterally outward swinging motion to an out-of-the-way position, and releasable latch means normally preventing such motion; there being a rear cross beam connecting said rearward sections, said rear cross beam being in two parts, and the releasable latch means connecting said parts.

9. A bed construction for a low bed truck including wheels on opposite sides of the bed and intermediate its ends, with the wheels projecting above said bed; said bed comprising transversely spaced, longitudinal load supporting side beams, said side beams each including a forward section and a rearward section, the wheels supporting the forward sections adjacent their rear ends, the sections of corresponding side beams being normally substantially longitudinally alined, means mounting the rear sections for laterally outward swinging motion to an out-of-the-way position, and releasable latch means normally preventing such motion; said mounting means being hinges between and on the outside of corresponding sections at adjacent ends, said corresponding sections having stabilizing means between the same when longitudinally alined.

10. A bed construction for a low bed truck including wheels on opposite sides of the bed and intermediate its ends, with the wheels projecting above said bed; said bed comprising transversely spaced, longitudinal load supporting side beams, said side beams each including a forward section and a rearward section, the wheels supporting the forward sections adjacent their rear ends, the sections of corresponding side beams being normally substantially longitudinally alined, means mounting the rear sections for laterally outward swinging motion to an out-of-the-way position, and releasable latch means normally preventing such motion; said mounting means being hinges between and on the outside of corresponding sections at adjacent ends, said corresponding sections having laterally inwardly facing channels, and longitudinal stabilizing arms secured to one thereof in the channel and normally but removably engaged in the channel of the other.

11. A truck bed construction comprising a low load supporting bed, and wheels supporting the bed intermediate its ends and projecting above the bed, the bed rearwardly of the wheels being sectional, and means mounting the rear section for movement between a normally longitudinally alined position and a laterally disposed out-of-the-way position.

12. A truck bed construction comprising a low load supporting bed, and wheels supporting the bed intermediate its ends and projecting above the bed, the bed rearwardly of the wheels being sectional, and means mounting the rear section for movement between a normally longitudinally alined position and a laterally disposed out-of-the-way position; said rear section including separate longitudinal parts mounted for laterally outward swinging in opposite directions.

13. A bed construction for a load carrying vehicle comprising one load carrying section disposed between the wheels of the vehicle and substantially below the upper peripheries of such wheels, another load carrying section disposed to the rear of the wheels and lying in the same plane as the first section, said sections including alined channel shaped beams, the beams of the second section being hinged to the beams of the first section for lateral swinging movement relative thereto, latch means for releasably securing the free ends of the beams of the second section together, a stabilizer arm fixed to the inner end of each of the beams of the second section and projecting therefrom into the channels of the beams of the first section when the beams of the second section are in normal load carrying position, whereby to prevent the second section from sagging and to prevent strain on the hinged connection between the sections when the second section is under load.

KARL GEORGE NIELSEN.

REFERENCES CITED

The following references are of record in the file of this patent:

UNITED STATES PATENTS

| Number | Name | Date |
|---|---|---|
| 2,011,965 | Ball | Aug. 20, 1935 |
| 2,013,890 | Kuns | Sept. 10, 1935 |

FOREIGN PATENTS

| Number | Country | Date |
|---|---|---|
| 473,690 | Germany | July 20, 1928 |